United States Patent

[11] 3,611,375

| [72] | Inventors | Torrence H. Chambers<br>Washington;<br>Lawrence F. Kalnoskas, Washington, D.C.;<br>Garold K. Jensen, Alexandria, Va. |
|---|---|---|
| [21] | Appl. No. | 889,207 |
| [22] | Filed | Dec. 30, 1969 |
| [45] | Patented | Oct. 5, 1971 |
| [73] | Assignee | The United States of America as represented by the Secretary of the Navy |

[54] RADAR USING MATRIX STORAGE AND FILTERS
21 Claims, 15 Drawing Figs.

[52] U.S. Cl. .................................................. 343/7.7, 343/8, 343/9
[51] Int. Cl. ................................................... G01s 9/42
[50] Field of Search ........................................ 343/7.7, 8, 9

[56] References Cited
UNITED STATES PATENTS

| 3,171,118 | 2/1965 | Chambers et al. | 343/7.7 X |
| 3,246,330 | 4/1966 | Balding | 343/7 TA X |
| 3,404,399 | 10/1968 | Eschner | 343/7.7 |

*Primary Examiner*—T. H. Tubbesing
*Attorneys*—R. S. Sciascia, Arthur L. Branning and J. G. Murray

ABSTRACT: A radar in which samples of the video signal are stored in capacitor matrix storage units. In one embodiment the stored signal samples are read out into filtering which provides, for display, outputs related to the doppler components in the video signal. In other embodiments, the storage readout is through filtering that provides, for display purposes, outputs which indicate the presence of a moving target (MTI). The individual filters include resistors which are weighted in value so as to have predetermined band-pass patterns and center frequencies.

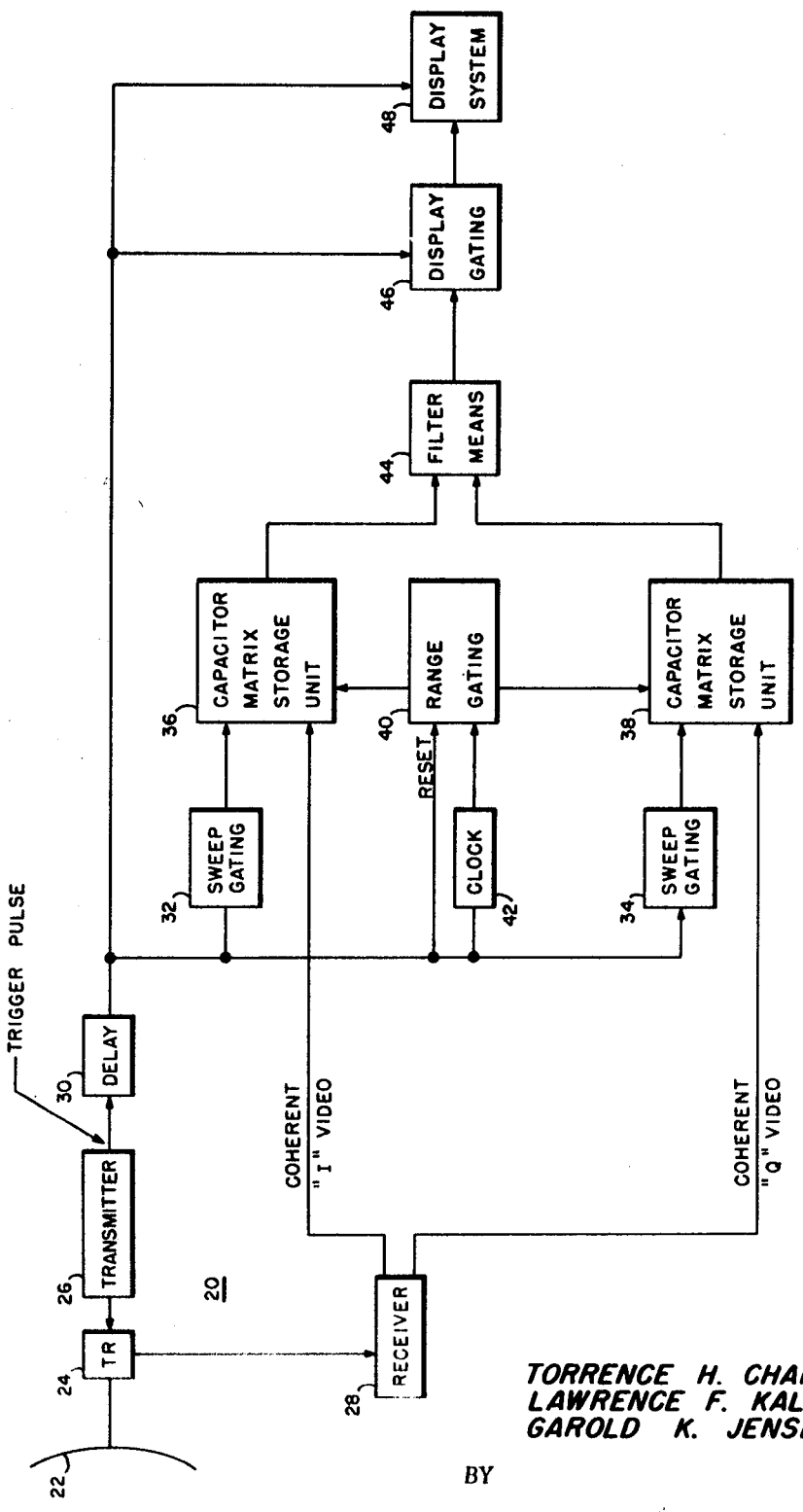

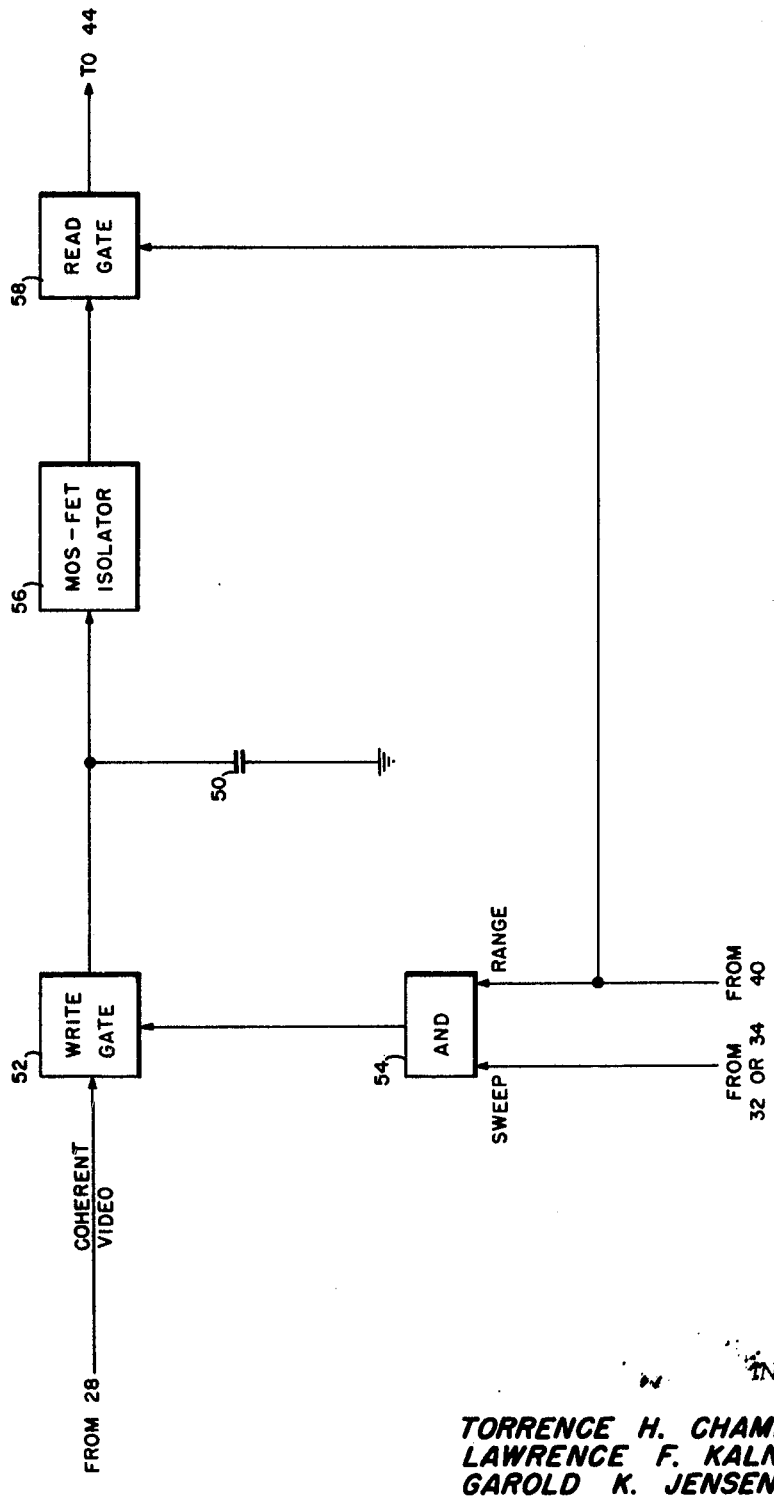

36 OR 38

INVENTORS
TORRENCE H. CHAMBERS
LAWRENCE F. KALNOSKAS
GAROLD K. JENSEN

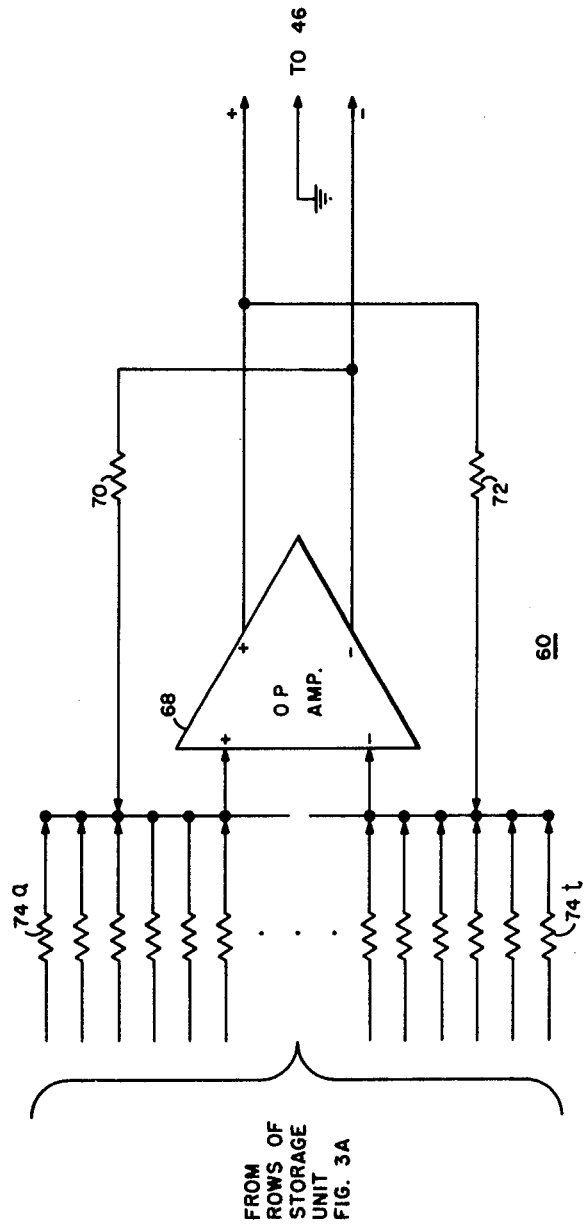

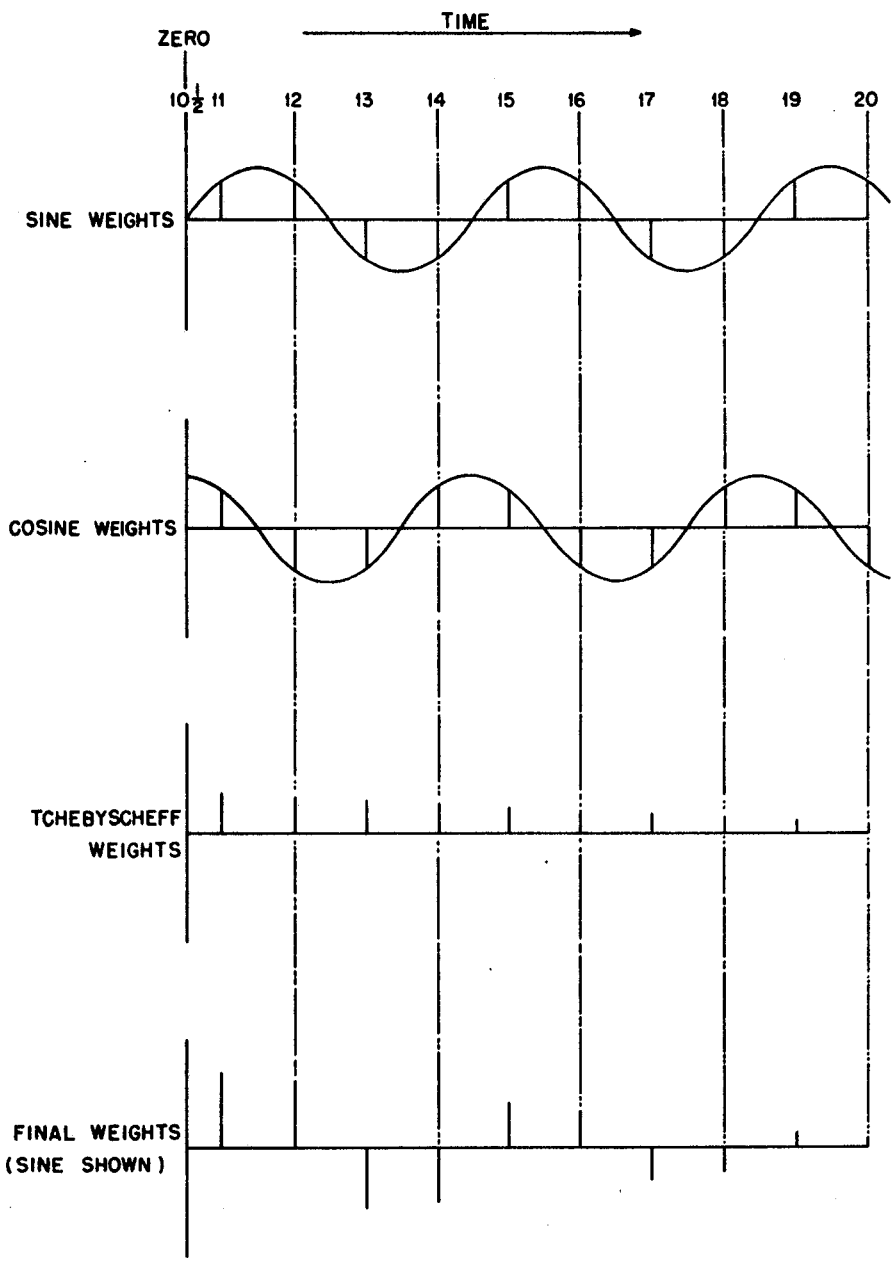

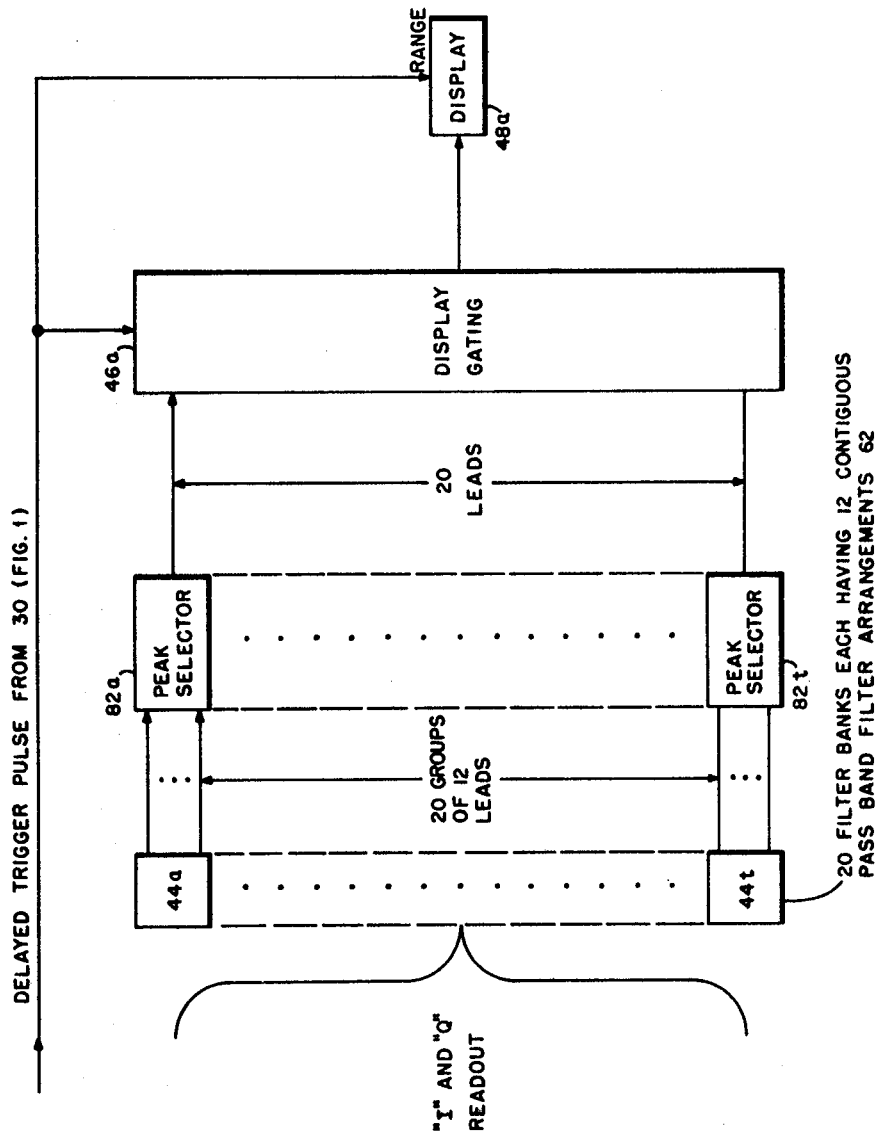

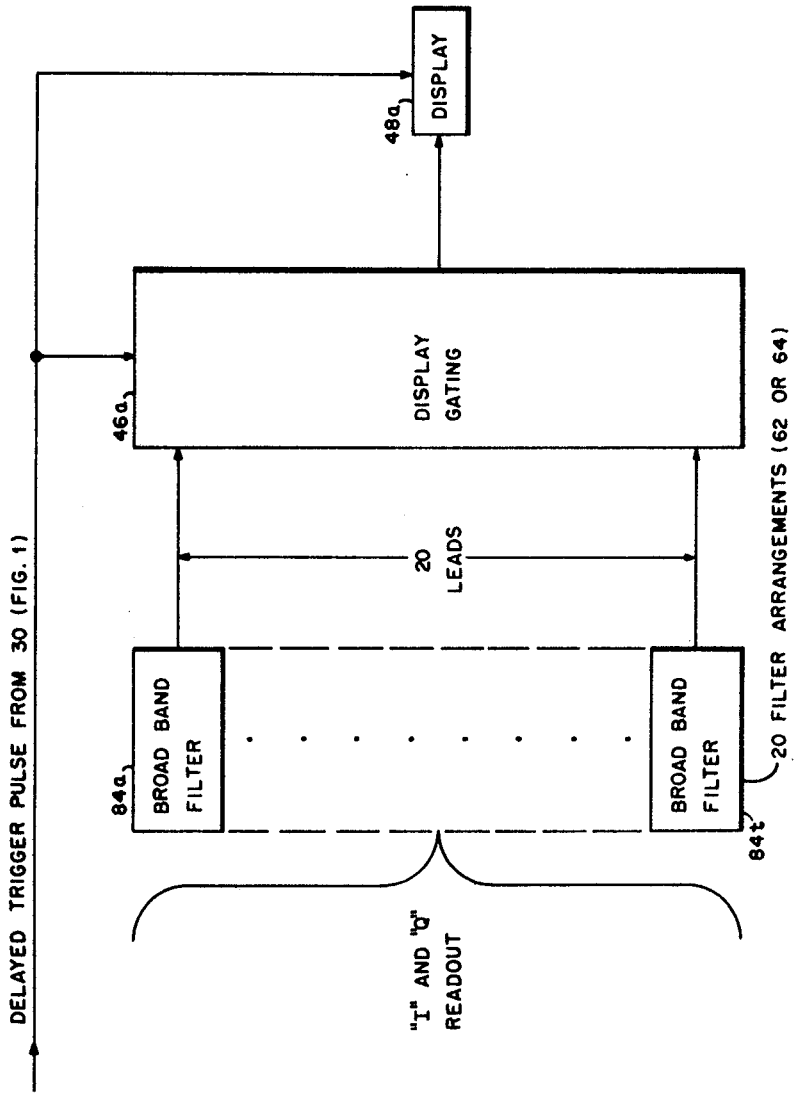

RADAR USING MATRIX STORAGE AND FILTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the rapid development of the radar technology, the capability of detecting targets has often outpaced the capability to electronically process and supply to the operator, in usable form, the immense amount of information available in the radar return. Many data processing and display systems, which have been developed for more recent radar, have used such diverse devices as rotating magnetic drums, storage tubes, magnetic tape storage, etc. For the most part, these systems have been mechanically and electronically complex, very expensive to manufacture and to maintain, prone to breakdown and maladjustment and, in general, unsatisfactory.

SUMMARY OF THE INVENTION

This invention improves on the prior radars by using extremely simple and reliable electronic components and circuits. Capacitors, resistors and electronic switches are widely used to perform the storage, correlation and information retrieval function of the invention.

More specifically, the invention contemplates that the radar video signal is constantly sampled at a rapid rate and that these samples are routed by electronic switching to be stored in a matrix organization of capacitors. The stored samples are read out by means of electronic switching into filtering means wherein the correlation process is accomplished and wherein the individual filters include resistive impedance components which are weighted in value so as to have predetermined bandpass patterns and center frequencies. The outputs of the filtering means are used either as representing the doppler frequency components of the video signal or as indicating the presence of a moving target.

OBJECTS OF THE INVENTION

It is an object of the invention to provide an improved radar.

Another object of the invention is to provide an improved radar which is highly reliable and uses simple electronic components and circuitry.

Still another object is to provide an improved radar wherein video signal samples are stored in capacitor matrix units and read out into filtering means which include resistive matrix filters that provide outputs representative of the doppler frequency components in the video signal or which are indicative of the presence of a moving target (MTI).

DESCRIPTION OF THE DRAWINGS

Other objects and many of the attendant advantages of this invention will be readily appreciated as the same becomes better understood by reference to the following detailed description of embodiments of the invention when considered in connection with the accompanying drawings in which like reference numerals designate like parts throughout the figures thereof and wherein:

FIG. 1 illustrates the invention in block diagram form.

FIG. 2 shows the elemental storage circuit.

FIGS. 4A, 4B and 4C show different embodiments of the elemental matrix filter of the invention.

FIGS. 5A, 5B, 5C and 5D are diagrams useful in understanding the weighting techniques relating to the resistors in the matrix filters.

FIGS. 8 and 9 which illustrate the filtering, gating and display sections of embodiments of the invention which indicate moving targets (MTI).

DESCRIPTION OF THE INVENTION

Figure 3A:
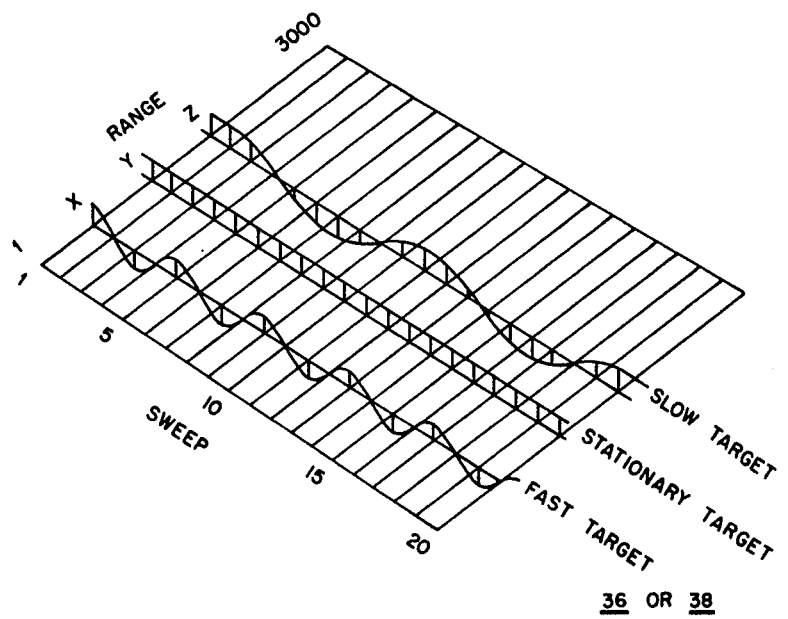
FIGS. 3A and 3B are diagrams useful in understanding the storage matrix of the invention.

Referring now to the drawings, and particularly to FIG. 1 which illustrates the invention in block diagram form, the radar 20 is shown as including an antenna 22 which is connected through a TR device 24 to the radar transmitter 26 and receiver 28, all of which cooperatively function in the manner which is well known. The transmitter trigger pulse signal is connected through delay 30 to drive the sweep-gating controls 32 and 34 of capacitor matrix storage units 36 and 38 which are controlled in the range parameter by the range-gating control 40 that is driven by clock 42. The delayed trigger pulse output of component 30 is connected to reset range-gating control 40 and to synchronize clock 42. Input to the matrix storage units 36 and 38 is obtained from the coherent "I" (in phase) and "Q" (quadrature) video output signals of the receiver 28. Capacitor matrix storage units 36 and 38 are read out into matrix filter means 44, which will subsequently be described in more detail, and which furnish target information in cooperation with the display gating 46 and the radar display system 48. As shown, the gating 46 and the display system 48 are connected to be controlled by the pulse output of delay 30.

Although the operation of the invention will be better understood as the description proceeds into more detail, the reader will be by now, no doubt, aware of the general operation of the radar correlator and display system shown in FIG. 1. After an appropriate delay, to allow the receiver to attain full sensitivity and to avoid the storage of reflections from very near targets (typically within 2 miles) successive scans of the "I" and "Q" coherent video signals are sampled by gating 32 and 34 (scan) and by gating 40 (range) and stored in the range bins of capacitor matrix storage units 36 and 38, the newest information displacing the oldest information. The readouts of the storage units 36 and 38 are combined and correlated in filter means 44 which, together with pulse-controlled display gating 46, provide information to display 48.

Figure 3B:
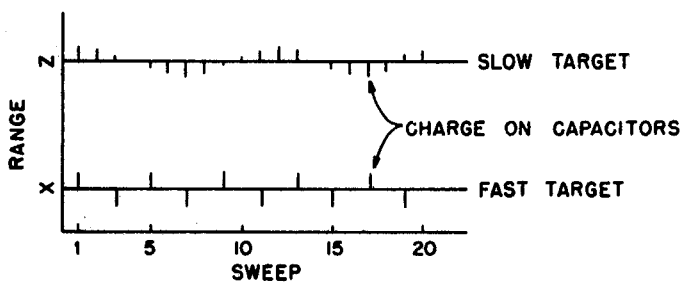
Figure 6:
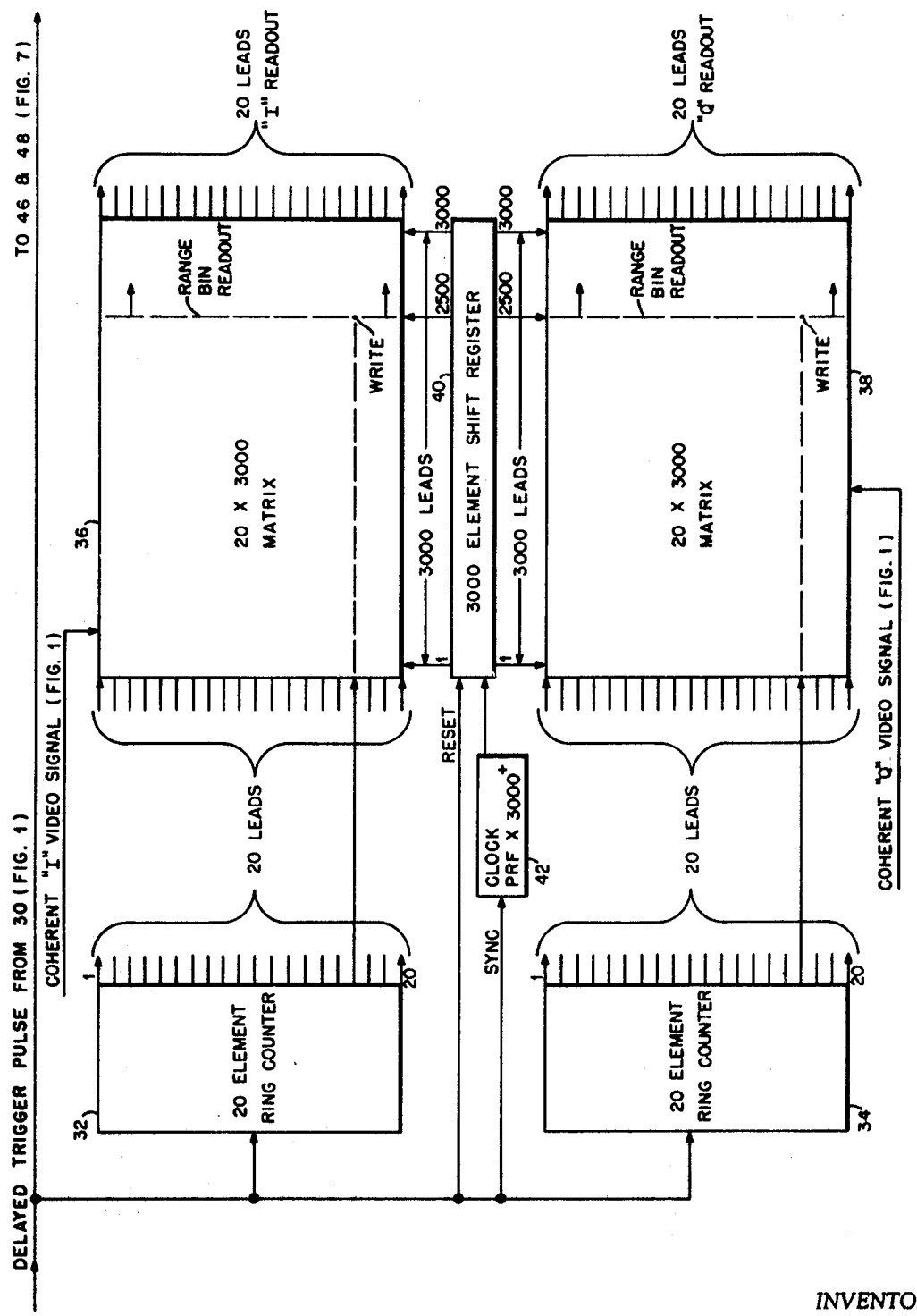
FIG. 6 which pertains to the input gating and storage units and FIG. 7, which pertains to the filter banks, display gating and display, illustrate an embodiment of the invention which provides information concerning the target velocity.
Figure 7:
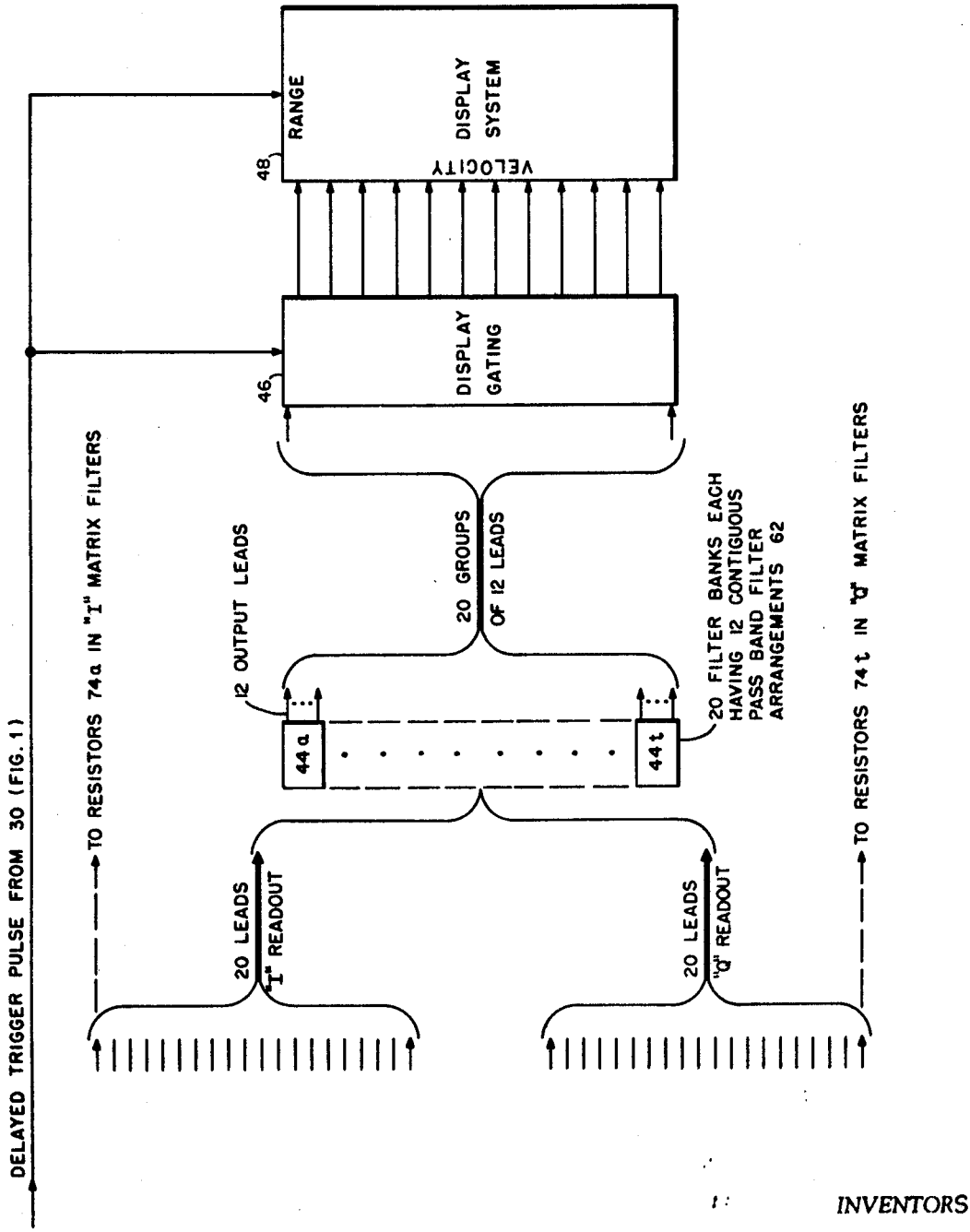

Before proceeding with a detail description of the invention and of FIGS. 6 and 7, it will be helpful to describe more fully certain aspects of the structure, theory and function of capacitor matrix storage units 36 and 38 while referring to FIGS. 2, 3A and 3B and certain aspects of the structure, theory and function of the individual filters of the filter means 44 while referring to FIGS. 4A, 4B, 4C, 5A, 5B, 5C and 5D.

Referring now to FIG. 2, which illustrates the basic storage element that is arranged in matrix configuration and in large numbers in the storage units 36 and 38. The storage capacitor 50 is charged by a sample of the coherent video signal from receiver 28. The sample is obtained through gate 52 which is controlled to open by AND gate 54 upon the concurrent arrival of signals from the sweep gating (32 or 34) and from the range gating 40. The reader will recognize that capacitor 50 must be chosen to have properties such that it will become at least approximately charged to the signal level of the video signal during the short time period that the video signal is sampled by gate 52. An isolator 56, typically a MOS-FET (metal-oxide-semiconductor field-effect transistor) having an input impedance of $10^{12}$ ohms, is connected to capacitor 50 and permits the nondestructive readout of the charge on capacitor 50 through gate 58, which is controlled to open by the signal from range gating 40. The readout is into the filter means 44.

In a typical embodiment of the invention, 120,000 of the basic storage elements shown in FIG. 2 are arranged in 20×3,000 matrix form in each of the storage units 36 and 38. It is to be understood, of course, that such numerical matrix parameters are merely used for illustrative purposes and are in no way a limitation of the invention.

Referring now to FIG. 3A, which schematically shows a 20×3,000 matrix, the 20 rows being individually associated with individual pulse returns, in much the same manner as the well-known A-scope sweeps, and the 3,000 matrix columns being associated with returns from particular ranges in a manner often described as range bins. In other words, and as will be described latter in more detail, the gating 32 (or 34) functions to sample the video of each pulse return 3,000 times, the first sample from the nearest range of interest, typically 2 miles, being stored in the first matrix column and the last sample, from the maximum range, being stored in the 3,000th matrix column. The 3,000 samples from the first pulse return are stored in the first matrix row, the samples from the °th pulse are stored in the °th matrix row, the samples from the 21st pulse are stored in the first matrix row, etc.

As is well known, when successive A-scope sweeps are superimposed, the return from stationary targets does not change but the return from moving targets varies in amplitude at a rate corresponding to the doppler frequency, i.e. the radial velocity, of the target. Similarly, the samples stored in the capacitors of a particular range bin, or matrix column, of the storage unit schematically shown in FIG. 3A vary with a frequency relating to the radial velocity of a target in the range associated with the particular range bin. FIG. 3A illustratively represents the individual capacitor charges, and the envelopes thereof, for a fast-moving target in range bin X, a stationary target in range bin Y (all capacitors charged equally) and for a slow target in range bin Z. FIG. 3B shows, perhaps more clearly, the individual capacitor charges relating to the moving targets in the range bins X and Z.

As may be evident from FIG. 2 wherein the opening of the read gate 58 requires only a signal from the range gating 40, the read out of the storage matrix 36 or 38 is in a manner which simultaneously connects all of the individual capacitors in a particular range bin to the filter means 44 wherein correlation processes and filter structures yet to be described are used, in the embodiment of FIG. 7, to produce a signal signifying the doppler frequency shift, i.e. velocity, of a target in the range associated with the particular range bin. In other words, range gating 40 will simultaneously connect all of the capacitor charges in range bin X (FIGS. 3A and 3B) to filter means 44 which, in the embodiment of FIG. 7, produces a signal representative of a relatively high doppler frequency shift, i.e., a fast target. Next, the gating 40 connects all of the equally charged capacitors in range bin, or matrix column, Y to the filter means 44 which typically is not designed to correlate with the return from a stationary or very low velocity target and therefore will not produce a signal because of the lack of a doppler frequency shift. As the reader will anticipate, the gating 40 will next simultaneously connect all of the capacitors in matrix column Z to filter means 44 which produces, in the embodiment of FIG. 7, a signal representative of the low velocity of the target in the range related to the range bin Z. The embodiments of FIGS. 8 and 9 use slightly differing techniques to obtain MTI.

Figure 4B:
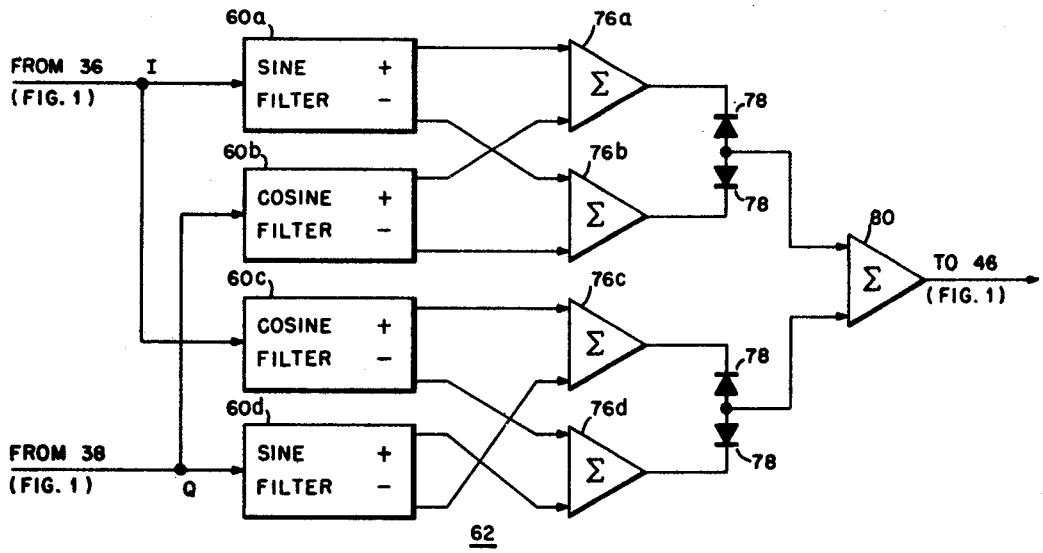
Figure 4C:
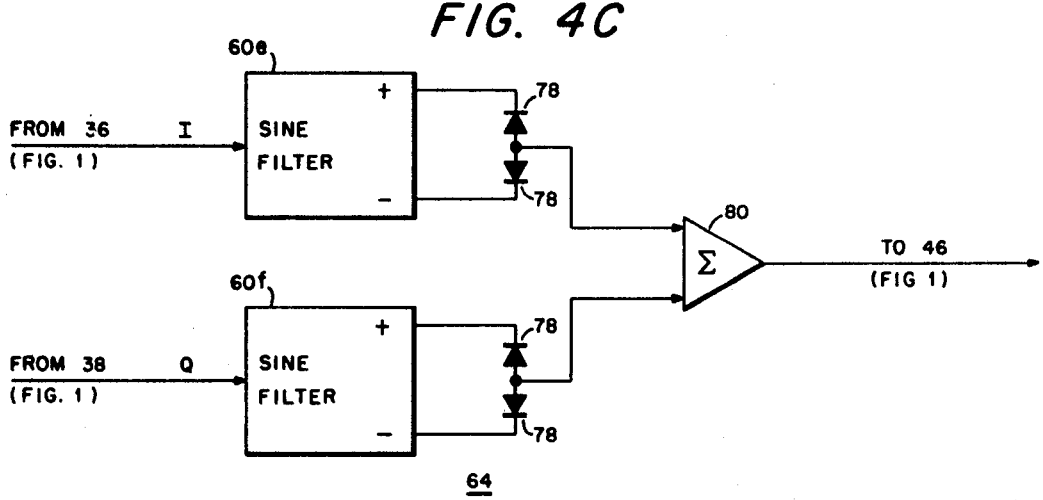

Proceeding now to FIG. 4A which shows a matrix filter 60 that is an elemental form of the more sophisticated matrix filters 62 (FIG. 4B) and 64 (FIG. 4C) which the invention contemplates as being used in large numbers in the filter means 44. While the reader should recognize that other types of filters and other schemes of correlation could be used with the capacitor matrix storage units 36 and 38, the unique combination of matrix type filtering, such as shown in FIGS. 4A, 4B and 4C, with the capacitor matrix storage units 36 and 38 is an important and novel feature of this invention. This combination has been found through experimental verification to provide a high quality of information retrieval by the correlation process from the radar return.

In FIG. 4A, the operational amplifier 68 is connected in a summing configuration with the feedback resistors 70 and 72 connected between opposing polarity input and output terminals. The two input terminals of operational amplifier 68 are connected to the (typically 20) rows of the capacitor matrix storage unit (36 or 38) shown in FIG. 3A through 20 resistors 74 a...t which are weighted both by ohmic value and by polarity according to techniques which will presently be described together with FIGS. 5A, 5B, 5C and 5D. The positively weighted resistors are connected to the positive input terminal of operational amplifier 68 and the negatively weighted resistors are connected to the negative input terminal of this amplifier. The amplifier output is connected to the display gating 46.

FIGS. 5A, 5B, 5C and 5D are helpful in explaining the techniques of design used in determining the weighting factors for the resistors 74 a...t of the matrix filter 60. The matrix type of filter is theoretically based upon the Fourier Transformation and is capable of operating by correlation processes on data sampled from a complex wave to extract the energy relating to a frequency component of the wave.

The curve in FIG. 5A represents a sine wave of the desired center frequency of the filter being designed. The curve is sampled at the pulse repetition frequency (prf) of the radar 20, it being recalled that the resistor 74 a...t are connected to the 20 capacitors in a particular range bin which have been charged with samples from the video relating to 20 successive radar pulses.

The cosine curve of FIG. 5B is similarly sampled. In both FIGS. 5A and 5B time zero is defined as occurring at midway between the th and th sample, thereby satisfying the design rule that the weighting factors must be symmetric about the center, with odd symmetry for the sine weights and even symmetry for the cosine weights.

If the weight factors of FIGS. 5A and 5B were used directly in the design of the matrix filter 60 (FIG. 4A), the resultant filter would have a main lobe response at the desired frequency. The side lobes, however, would be only 13 db. down. Such a large side lobe response would not be acceptable in the radar of FIG. 1.

To improve the side lobe characteristics, use is made of further weighting factors based on the various order solutions to the Tchebyscheff (often spelled Chebyshev) polynomial equation. These Tchebyscheff (or Dolph-Tchebyscheff) weights, illustrated symbolically in FIG. 5C, are multiplied with the sine or cosine weight factors of FIGS. 5A or 5B to obtain the final weight factors, the final sine weighting factors being shown in FIG. 5D. The ohmic values of the resistors 74 a...t are obtained by multiplying the ohmic value of the feedback resistors 70, 72 (FIG. 4A) with the final weighting factors obtained by the use of the Tchebyscheff weights.

In addition to the above considerations, the design of the filters must necessarily involve design tradeoffs relating to the size of the doppler frequency band of interest, the number of the incremental passbands intended to contiguously span the doppler band, the crossover points of the adjacent filters, etc.

Readers wishing to obtain further information about the Tchebyscheff weights (which are well known in the antenna and filter design fields) should look to "Introduction to Radar Systems" by Merrill I. Skolnik, McGraw-Hill 1962, beginning at page 323 and Tables of Chebyschev Polynomials, National Bureau of Standards Applied Mathematics Series, Dec. 9, 1952.

The filter 60 (FIG. 4A) is extremely phase sensitive. Therefore, a radar of the type shown in FIG. 1 and based on this type of filter would be unreliable.

It can be shown from the Fourier Transformation that the phase sensitivity of the single matrix filter 60 of FIG. 4A can be eliminated with a filter arrangement such that inphase and quadrature phase energy (the "I" and "Q" video of FIG. 1) are vectorily added and correlated by both sine and cosine weighted matrix filters. However, vector addition, and therefore this ideal solution, is impractical in the high-speed video circuitry of the radar system of FIG. 1.

It has been found that the filter arrangement shown in FIG. 4B, while slightly phase sensitive, provides a satisfactory approximation of the ideal (vector addition) solution obtained from the Fourier Transformation. In effect, the filter arrangement shown in FIG. 4B substitutes the addition of absolute values for the vectorial addition of the ideal solution.

In FIG. 4B the filter arrangement 62 is shown as including four matrix filters 60a, 60b, 60c and 60d, which are similar to the matrix filter 60 of FIG. 4A, except that weighted resistors (74a...t in FIG. 4A) are determined according to different considerations. The most obvious difference would, of course, be that the resistors of matrix filters 60b and 60c are determined by using cosine curve and Tchebyscheff weighting factors. For ease of drafting the inputs to filters 60a, 60b, 60c and 60d are shown as single lines. The reader should understand, however, that the matrix filters 60a and 60c are connected by 20 leads to the 20 outputs of capacitor matrix storage unit 36 and that the matrix filters 60b and 60d are connected to the capacitor matrix storage unit 38 of FIG. 1. In other words the matrix filters 60a and 60c simultaneously receive 20 samples of the coherent "I" video that are stored in a particular range bin in storage unit 36 while the matrix filters 60b and 60d are similarly receiving 20 samples of the coherent "Q" video that are stored in the analogous range bin in storage unit 38.

The positive terminals of matrix filters 60a and 60b are connected to summing amplifier 76a and the negative terminals of these filters are connected to summing amplifier 76b. The positive terminal of matrix filter 60c and the negative terminal of matrix filter 60d are connected to summing amplifier 76c while the negative terminal of filter 60c and the positive terminal of filter 60d are connected to summing amplifier 76d. The outputs of summers 76a and 76b are connected, as shown, through rectifiers 78 to one input of summing amplifier 80, the other input of which is connected through rectifiers 78 to summers 76c and 76d. The output of summing amplifier 80 is connected to the display gating 46 of FIG. 1.

In some embodiments of the invention it is possible to use the simpler filter 64 of FIG. 4C in place of the filter 62 of FIG. 4B. Such a filter substitution results in a saving of cost, weight, space, etc.

The filter 64 is based on the correlation of energy amplitude information only, without making use of phase information. It has been found that somewhat different design tradeoffs are necessary when using the filter 64. In particular, the Tchebyscheff weights must be chosen to more effectively limit the sidelobes and it has also been found that certain ambiguities of filter response exist for doppler frequencies which are lower than the sampling rate (prf).

As shown in FIG. 4C, the filter arrangement 64 includes matrix filters 60e and 60f which are connected by 20 leads to the 20 outputs of the I-capacitor matrix storage unit 36 and the Q-capacitor matrix storage unit 38, respectively. The outputs of matrix filters 60e and 60f are connected through rectifiers 78, as shown, to the input terminals of summing amplifier 80 which is in turn connected to the display gating 46 of FIG. 1. Although the matrix filters 60e and 60f are illustrated as including sine-weighted input resistors, the reader will recognize that these filters could also have been designed by using resistor values determined from cosine weighting factors.

The structure and function of an embodiment of the invention will now be described in connection with FIGS. 6 and 7. This will serve both as a summary of the preceding description of the invention and will emphasize certain details of structure and cooperative function which hitherto could not be brought out. The reader is again urged to recognize that the numerical parameters employed are merely for the sake of ease of description and that obviously other design choices could be made.

Referring now to FIG. 6, it is believed that no further discussion is required of the components 22–30 which produce by well-known processes, the coherent "I" and "Q" video signals and the trigger pulse signal which is delayed, typically for a time period equal to the 2 mile round trip travel time of electromagnetic radiation.

As shown in FIGS. 1 and 6 the delayed trigger pulse is connected to components 32 and 34 which typically are similar and in the form of 20 element ring counter which, under the control of the delayed trigger pulses, sequentially energize the 20 output leads of the ring counters. Although not shown in the drawings, it would be desirable to synchronize the ring counters 32 and 34. This expedient could be accomplished in many obvious ways, such as by interconnecting the counters reset circuitry or by combining the two counters into a single counter with each outlet lead having a double terminal.

FIGS. 1 and 6 also show that the delayed trigger pulses are connected to reset the shift register 40, which typically has 3,000 elements, and to synchronize the clock 42 that drives the shift register. Clock 42 has a counting rate of slightly over 3,000 times the radar prf, i.e. the clock 42 will count slightly more than 3,000 during the period between the delayed trigger pulses.

The FIGS. 1, 2, 3A and 6, when viewed together, will more fully disclose to the reader the structure and operation of capacitor matrix storage unit 36. Typically unit 36 is arranged in a 20×3,000 matrix and includes 60,000 of the elemental storage circuits of FIG. 2. In storage unit 36 each of the 60,000 write gates 52 are connected to receive the coherent "I" video signal from receiver 28. The sweep inputs of each of the 3,000 AND gates 54 in a particular one of the 20 matrix rows of storage unit 36 are connected to a particular one of the 20 output leads of ring counter 32. The range inputs of each of the 20 AND gates 54 in a particular one of the 3,000 matrix columns (range bins) of storage unit 36 are connected to a particular one of the 3,000 output leads of shift register 40. When both inputs to AND gate 54 are energized, a sample of the coherent "I" video signal is stored on the associated capacitor 50. As schematically shown in FIG. 6, the th capacitor in range bin 2,500 is being charged by a sample of the coherent "I" video signal. It will be apparent that ring counter 32 and shift register 40 cooperate to sequentially charge, row by row, the 60,000 capacitors contained in storage unit 36 and that when the storage unit is filled, newer samples replace the older stored samples. As previously explained in connection with FIG. 3A, the 20 capacitors 50 in a particular range bin are charged in a manner reflecting the doppler frequency of a target in that particular range.

Recalling that the range input of all of the 20 AND gates 54 in a particular one of the 3,000 range bins are connected to a particular one of the 3,000 outputs of shift register 40 and that, as shown in FIG. 2, the read gate 58 is connected to the range input of AND gate 54, it is apparent that the readout of all 20 capacitors 50 in a particular range bin exists simultaneously on the 20 output leads of storage unit 36. FIG. 6 schematically illustrates the readout of the 2,500th range bin.

The reader will understand, without detailed description, that the capacitor matrix storage unit 38 is similarly controlled by 20 element ring counter 34 and shaft register 40 to sample, store and read out the coherent "Q" video signal.

Referring now to FIGS. 4B and 7, the 20 "I" readout leads from storage matrix unit 36 and the 20 "Q" readout leads from storage matrix unit 38 are each connected to the weighting resistors of 240 filter arrangements, such as the arrangement 62 shown in FIG. 4B (arrangement 64 of FIG. 4C could also be used). The 240 filter arrangements are grouped in the 20 filter banks 44a...t, each bank having 12 filter arrangements with passbands that contiguously span the doppler band of the radar. The reader should here recall that each of the single line "I" and "Q" inputs in FIG. 4B is representative of 20 input leads to the 20 weighting resistors 74a...t included in the matrix filters 60a, b, c and d. In other words, the top output lead from storage unit 36 is connected to the weighting resistors 74a in each of 240 sine weighted filters 60a and in each of 240 cosine weighted filters 60c. Similarly the bottom output lead from storage unit 38 is connected to the weighting resistors 74t in each of 240 cosine weighted filters 60b and in each of 240 sine weighted filters 60d.

The weighting resistors of the 240 filter arrangements 62 are calculated, in a discussed in connection with FIGS. 5A, 5B, 5C and 5D, so that 20 filter banks 44a...t are formed with each bank including 12 filter arrangements 62 that have 12 different center frequencies and passbands that contiguously span the expected doppler frequency band of interest. The 20 filter banks 44a...t, although similar in that each bank has the same contiguous frequency passbands, are different in that a different definition of time zero is used in determining the values of the weighting resistors 74a...t for each one of the 20 filter banks.

In calculating the resistors 74a...t in the 20 filter banks 44a...t, it is assumed that for each of the 20 different filter banks, time zero is defined with a different one of the 20 output leads of ring counters 32 and 34 energized. In other words, as different ones of the 20 outputs of rings counters 32 and 34 are sequentially energized, and samples of the coherent video signals are sequentially read into different ones of the 20 rows of the matrix storage units 36 and 38, different ones of the 20 different filter banks 44a...t will become capable of performing correlation processes upon the range bin readouts from storage units 36 and 38.

The functional purpose of display gating 46 is to sequentially connect the 12 output leads of the filter bank 44a...t, which at that instant is capable of performing the correlation processes, to the display device 48. So many ways of accomplishing such a gating function would be obvious to a person skilled in the electronic arts that it is not considered to be necessary to disclose circuit details of the gating 46. It is believed to be sufficient for the purpose of this disclosure to merely state that the circuitry contemplated by the inventor includes a 20-element ring counter, driven by the delayed trigger pulse and similar to the counters 32 and 34, that is used to sequentially open and close appropriate groups of transistorized gates.

The reader will now recognize that signals in the 12 output leads of gating 46 are representative of 12 different values of target velocity in a direction radial to the radar.

Similarly, the exact form of the display system 48 is not, per se, a part of this invention since many varieties of the system would occur to a skilled person. For example, computers, CRO devices, recording systems, could all be used. To satisfy the needs of the invention, it is only necessary that the display system provide an indication as to which of the one or more of the 12 input leads to the display contains a signal and from which range bin. The latter parameter usually is most easily obtained by some sort of time measurement relative to the delayed trigger pulse.

To summarize in connection with FIGS. 6 and 7, there has been disclosed an improved radar wherein coherent "I" and "Q" video signals are sampled and the samples stored in the capacitor matrix storage units 36 and 38 and read out into the filter bands 44 a...t which provide an output representative of the doppler frequency components in the video signals.

FIGS. 8 and 9 illustrate embodiments of the invention which provide MTI. The embodiment shown in FIG. 8 and the embodiment illustrated in FIGS. 6 and 7 are identical in structure and function to the point where the "I" and "Q" readout from capacitor matrix storage units 36 and 38 are passed through the 20 filter banks 44a...t.

As shown in FIG. 8, the 12 output leads from each of the 20 filter banks 44a...t are connected to a peak selector 82a...t which passes only the largest of the signals received on the 12 output leads of the associated filter bank. Preferably the peak selectors 82a...t, of which many suitable types are known, includes a threshold feature whereby all signals below a given amplitude are blocked. The output lead for each of the 20 peak selectors 82a...t are connected to display gating 46a which functions in a manner analogous to the previously discussed gating 46 in FIG. 7, i.e. to connect to the display 48a the single output lead of the peak selector which, in turn, is connected to the filter 44a...t which, at that instant, is capable of performing the correlation process. As shown, both the gating 46a and the display 48a are controlled by the delayed trigger pulse from component 30 (FIG. 1). As with the display 48 of FIG. 7, numerous devices for use as the display 48a are known and the exact form, which is not per se part of the invention, can be left as a matter of choice to the designer.

In some radar applications, particularly in systems designed to provide protection against the threat of low-flying attackers, the radar range is horizon limited and the added sensitivity provided by the bank of filters 44a...t is of little or no value. In the embodiment of the invention illustrated in FIG. 9, the desired MTI performance against low-flying attackers is obtained, with considerable simplification, by using single broadband filters in place of the filter banks.

Referring now to FIG. 9, the 20 "I" readout leads from storage matrix unit 36 and the 20 "Q" readout leads from storage matrix unit 38 (FIG. 6) are each connected to the weighting resistors of 20 filter arrangements, such as the arrangement 62 shown in FIG. 4B or 64 shown in FIG. 4C. These 20 filter arrangements 84a...t each are designed to have a broad passband which includes the doppler frequency band of interest, i.e. the passband of the filters 84a...t are similar to the total passband of the filter banks 44a...t and to the 12 contiguous passbands therein. The output of the 20 broad band filters 84a...t are connected through the display gating 46a to the display 48a which are identical in structure and function to that described in connection with FIG. 8.

In connection with the embodiment of FIG. 9, it is fairly obvious that in the event a radar is designed solely for the purpose of short-range protection against low-flying attackers, the number of range bins in the capacitor matrix storage units can be made much less than the number, typically 3,000, required for long-range protection.

It is by now apparent that the embodiments of the invention illustrated in FIGS. 8 and 9 are similar to that of FIGS. 6 and 7 but differ therefrom by using filtering and peak selectors which provide MTI display without incremental target velocity information.

It should be understood, of course, that all of the foregoing disclosure relates only to preferred embodiments of the invention and that numerous modification or alterations may be made without departing from the spirit and scope of the invention as set forth in the appended claims. In particular, the expedient of using switching to include two or more embodiments of the invention into a single multimode radar is considered to be such a matter of routine engineering as not to require detailed description.

What is claimed and desired to be secured by Letters Patent of the United States is:

1. A radar comprising:
    transmitting and receiving means providing trigger pulse, inphase "I" and quadrature "Q" coherent video signals;
    first capacitor matrix storage means connected to be synchronized by said trigger pulse signal and to receive said "I" video signal and functioning to store samples of said "I" video signal;
    second capacitor matrix storage means connected to be synchronized by said trigger pulse signal and to receive said "Q" video signal and functioning to store samples of said "Q" video signal;
    filter means connected to receive the outputs of said first and second capacitor matrix storage means and having a plurality of outputs;
    a display system and
    gating means controlled by said trigger pulse signal to sequentially connect said plurality of filter means outputs to said display system.

2. The radar of claim 1 wherein said filter means includes a plurality of broad band filters.

3. The radar of claim 2 wherein said broadband filters are matrix-type filters which are characterized by including a plurality of parallel input resistors, the values of said resistors being determined by calculations relating to the desired center frequency and to the desired band-pass of said filter and including weight factors relating to the desired response of said filter.

4. The radar of claim 1 wherein said filter means includes an equal plurality of filter banks and peak selectors, said filter banks being characterized by each having a plurality of output leads which are connected to a peak selector.

5. The radar of claim 4 wherein each filter bank includes a plurality of filters which have center frequency and frequency response characteristics such that the passbands of said plurality of filters contiguously span the doppler frequency band of the radar.

6. The radar of claim 5 wherein each of said plurality of filters is characterized by including a plurality of parallel input resistors, the values of said resistors being determined by calculations relating to the desired center frequency and to the desired band-pass of said filter and including Tchebyscheff weight factors relating to the desired side lobe response of said filter.

7. The radar of claim 1 wherein said filter means includes a plurality of filter banks, each filter bank being characterized by having a plurality of output leads which are sequentially connected as a group to said display system by said gating means.

8. The radar of claim 7 wherein each filter bank includes a plurality of filters which have center frequency and frequency response characteristics such that the passbands of said plurality of filters contiguously span the doppler frequency band of the radar.

9. The radar of claim 8 wherein each of said plurality of filters is characterized by including a plurality of parallel input resistors, the values of said resistors being determined by calculations relating to the desired center frequency and to the desired band-pass of said filter and including Tchebyscheff weight factors relating to the desired side lobe response of said filter.

10. The radar of claim 1 wherein said display system is synchronized by said trigger pulse signal.

11. In a radar system wherein the coherent video signal is sampled and stored in capacitor storage matrix means having a plurality of $2n$ output leads where $n$ is an integer equal to or greater than 6, signal correlator means comprising:
   $n$ filter banks, each filter bank including a plurality of filters and each filter having $2n$ input leads and a single output lead, the $2n$ input leads of each filter being connected to the $2n$ leads of said capacitor storage matrix means;
   a display system having a plurality of input leads equal in number to the plurality of filters in each filter bank and
   gating means functioning to sequentially connect said display system with said filter banks.

12. In the radar system of claim 11 wherein said capacitor storage matrix means stores samples of the inphase and quadrature phase coherent video signal and wherein the energy of said inphase and quadrature samples is combined in said filter banks.

13. In the radar system of claim 12 wherein each one of said plurality of filters in each of said $n$ filter banks is an arrangement of a plurality of matrix-type filters, one-half of which are connected to receive inphase samples of said coherent video signal and the other half of which are connected to receive quadrature phase samples of said coherent video signal.

14. In the radar system of claim 13 wherein each matrix-type filter is characterized by including $n$ resistors connected to $n$ input leads of said filter, the values of said resistors being determined by calculations relating to the desired center frequency of said filter and to Tchebyscheff weight factors.

15. A radar comprising:
   transmitting and receiving means providing a trigger pulse, inphase "I" and quadrature "Q" coherent video signals;
   first and second capacitor matrix storage means, each storage means having $n$ rows and $r$ columns of storage capacitors, said first capacitor matrix storage means being connected to receive said "I" coherent video signals and said second capacitor matrix storage means being connected to receive said "Q" coherent video signal;
   storage-gating means controlled by said trigger pulse signal and functioning to control said first and second storage means to sample said "I" and "Q" coherent video signals and, after each trigger pulse, to sequentially store $r$ samples in the $r$ capacitors of a row and to store, sequentially row by row, $r$ samples of said "I" and "Q" coherent video signals after succeeding trigger pulses and, after each trigger pulse, to nondestructively read out the $n$ signals stored in all $r$ columns, said read out proceeding sequentially, column by column, until all $r$ columns are read out, said readout being through the $n$ output leads in each of said first and second capacitor matrix storage means;
   $n$ filter banks, each filter bank being connected to the $n$ output leads of said first capacitor matrix storage means and to the $n$ output leads of said second capacitor matrix storage means;
   a display system and
   display-gating means, controlled by said trigger pulse signal, to sequentially connect said filter banks to said display system.

16. The radar of claim 15 wherein each of said $n$ filter banks includes a plurality of $k$ filter arrangements, each filter arrangement having a center frequency and a frequency response such that the $k$ filter arrangements contiguously span the doppler frequency band of the radar.

17. The radar of claim 16 wherein each filter arrangement includes a plurality of matrix filters, one-half of which are connected to receive the readout of said first capacitor matrix storage means and the other half of which are connected to receive the readout of said second capacitor matrix storage means.

18. The radar of claim 17 wherein each matrix filter includes $n$ input resistors, the values of said resistors being determined by calculations relating to the desired center frequency of the filter arrangement which includes the matrix filter and to Tchebyscheff weight factors.

19. The radar of claim 18 wherein said display system has $k$ input leads and each filter bank has $k$ output leads.

20. In a radar system wherein the coherent video signal is sampled and stored in capacitor storage matrix means having a plurality of $2n$ output leads where $n$ is an integer equal to or greater than 6, signal correlator means comprising:
   a plurality of filter banks, each filter bank including a plurality of filters and each filter having $2n$ input leads and a single output lead, the $2n$ input leads of each filter being connected to the $2n$ output leads of said capacitor storage matrix means;
   a display system having a plurality of input leads equal in number to the plurality of filters in each filter bank and
   gating means functioning to sequentially connect said display system with said filter banks.

21. A radar comprising:
   transmitting and receiving means providing a trigger pulse, inphase "I" and quadrature "Q" coherent video signals;
   first and second capacitor matrix storage means, each storage means having $n$ rows and $r$ columns of storage capacitors, said first capacitor matrix storage means being connected to receive said "I" coherent video signal and said second capacitor matrix storage means being connected to receive said "Q" coherent video signal;
   storage gating means controlled by said trigger pulse signal and functioning to control said first and second storage means to sample said "I" and "Q" coherent video signals and, after each trigger pulse, to sequentially store $r$ samples in the $r$ capacitors of a row and to store, sequentially row by row, $r$ samples of said "I" and "Q" coherent video signals after succeeding trigger pulses and, after each trigger pulse, to nondestructively read out the $n$ signals stored in all $r$ columns, said read out proceeding sequentially, column by column, until all $r$ columns are read out, said readout being through the $n$ output leads in each of said first and second capacitor matrix storage means;

a plurality of filter banks, each filter bank being connected to the $n$ output leads of said first capacitor matrix storage means and to the $n$ output leads of said second capacitor matrix storage means;

a display system and display-gating means, controlled by said trigger pulse signal to sequentially connect said filter banks to said display system.